United States Patent

Schreiber

[11] Patent Number: 4,476,371
[45] Date of Patent: Oct. 9, 1984

[54] ELECTRICAL RESISTANCE SEAM WELDING METHOD AND APPARATUS

[75] Inventor: Peter Schreiber, Nidau, Switzerland

[73] Assignee: Fael S.A., Saint-Blaise, Switzerland

[21] Appl. No.: 504,488

[22] Filed: Jun. 15, 1983

[30] Foreign Application Priority Data

Feb. 15, 1983 [CH] Switzerland .................. 829/83

[51] Int. Cl.$^3$ ............................................. B23K 11/06
[52] U.S. Cl. .................................. 219/83; 219/81; 219/64
[58] Field of Search ................. 219/81, 82, 83, 84, 219/64, 119, 120

[56] References Cited

U.S. PATENT DOCUMENTS

| | | | |
|---|---|---|---|
| 3,842,235 | 10/1974 | Opprecht | 219/84 X |
| 4,137,444 | 1/1979 | Schalch | 219/84 X |
| 4,352,001 | 9/1982 | Ishibashi et al. | 219/64 |

FOREIGN PATENT DOCUMENTS

| | | |
|---|---|---|
| 436513 | 11/1964 | Switzerland . |
| 519961 | 4/1972 | Switzerland . |
| 536163 | 6/1973 | Switzerland . |

*Primary Examiner*—C. L. Albritton
*Assistant Examiner*—Catherine M. Sigda
*Attorney, Agent, or Firm*—Watson, Cole, Grindle & Watson

[57] ABSTRACT

An electric resistance seam welding method and apparatus includes a continuous wire electrode which is passed successively over a first electrode reel and thereafter over a second electrode reel via a plurality of guide and deflection rollers, the outer surfaces of the wire confronting each other when passing over the reels and being pressed together by the reels by a predetermined welding force against interposed workpieces to be seam welded together. An electric current is applied so as to pass from the second electrode reel to the first reel through the wire electrode and the interposed workpieces, and the wire electrode is motor driven for feeding the workpieces through the reels. A copper wire is utilized as the wire electrode and has a tensile strength at the elastic limit of between 11 and 13 kg-f/mm$^2$ and has a percentage elongation at break of 26 to 17%. The reels are pressed together by a force of 60 to 70 kg, and the copper wire is subject to a tensile stress of less than 10 kg-f/mm$^2$ while passing over and between the reels. The reels are maintained at an operating temperature of 10° to 30° C. as the wire electrode passes thereover, so that a maximum elongation of the wire of 6% when passing over the first reel, and a maximum further elongation of the wire of 6% when passing over the second reel, is attained.

13 Claims, 3 Drawing Figures

ELECTRICAL RESISTANCE SEAM WELDING METHOD AND APPARATUS

BACKGROUND OF THE INVENTION

This invention relates to a method and apparatus for carrying out electrical resistance seam welding with the use of a continuous wire electrode which passes successively over a first electrode reel and then over a second electrode reel, confronting the first reel, via a plurality of guide and deflection rollers, the wire electrode portions travelling over the reels being pressed at a predetermined welding pressure by the reels being pressed together so that overlapping ends of a workpiece disposed between the wire portions may be welded together while an electric current is applied so as to pass from one of the reels through the wire electrode and workpiece ends to the other reel. The wire electrode is motordriven for forwardly advancing the workpiece ends.

A welding apparatus of this general type is disclosed in Swiss Pat. No. 436,513. During operation of this known apparatus, the cross-section of the electrode wire is reduced during its travel over the first electrode reel while under the influence of a welding force and of the temperature prevailing at the welding area, while at the same time the initial length of the electrode wire is caused to increase. In order to prevent the elongated portion of the electrode wire from speeding up while passing over the second electrode reel, as compared to the speed of travel of the unelongated portion of the wire travelling over the first electrode reel, means are provided for forming and receiving a wire loop between the two reels, as well as for taking up this loop when there is no pressure applied to the reels.

Another known apparatus for carrying out electric resistance seam welding is disclosed in Swiss Pat. No. 519,961 in which a wire electrode having an initially round cross-section is pressed into a flattened cross-sectional shape prior to its travel over the first electrode reel by means of a driven pair of press rollers. During this rolling process, the wire electrode assumes a higher strength and a correspondingly smaller elongation so that there is no further elongation of the wire at the welding area, thus eliminating the need for a loop-takeup device. Hence, the wire electrode used in this apparatus is a "hard wire".

This concept relating to use of such a "hard wire" is discussed in more detail in Swiss Pat. No. 536,163 which describes a round wire, for example a copper wire, as being finish-rolled unitl it reaches a 50% higher tensile strength at the elastic limit, for example 13 kg-f/mm$^2$, and preferably a 100% higher tensile strength at the elastic limit, for example 18 kg-g/mm$^2$, than prior to the finish-rolling operation.

In principle, when using a hard wire as a wire electrode for electrical resistance seam welding, elongation of the electrode wire during its first travel through the welding area can be substantially avoided. However, the hard wire does not conform well to the workpieces to be welded under the influence of the welding pressure, relatively large deflection forces are required for appropriately passing the hard wire over the electrode reels and deflection rollers, and the hard wire is more brittle which increases the danger of operational breakdowns.

SUMMARY OF THE INVENTION

It is therefore an object of the present invention to provide an electrical resistance seam welding method and apparatus which avoids the need for a hard wire electrode, while at the same time avoids the need for a loop-takeup device between the first and second reels without affecting the quality of the resulting welding seam.

Another object of this invention is to provide such a method and apparatus of the general type described above in which the wire electrode comprises a copper wire which, when entering the apparatus, has a tensile strength at the elastic limit of between 11 and 13 kg-f/mm$^2$ and has a percentage elongation at break in the range of 26 to 17%, the reels being pressed together by a force of 60 to 70 kg, and the copper wire being subject to a tensile stress of less than 10 kg-f/mm$^2$ while passing over and between the reels. The wire undergoes a maximum elongation of 6% when passing over the first reel and a maximum further elongation of 6% when passing over the second reel as the reels are maintained at an operating temperature of 10° to 30° C.

A further object of this invention is to provide such a method and apparatus wherein, the wire, when entering the apparatus, has a tensile strength at the elastic limit of approximately 12 kg-f/mm$^2$, and a percentage elongation at break of approximately 21%.

A still further object of this invention is to proved such a method and apparatus wherein the wire, while passing over and between the reels, is under a tensile stress of 2 to 6 kg-f/mm$^2$.

A still further object of the present invention is to provide the second reel as being motor driven for driving the wire about the reels which effects a rotation of the first reel and a forward advancing of the interposed workpiece ends, the wire being subject to a maximum tensile stress of 6 kg-f/mm$^2$ before the wire reaches the first reel.

A still further object of this invention is to provide such a method and apparatus wherein the copper wire is pulled away from the second reel for imparting thereto a tensile stress of 10 kg-f/mm$^2$ maximum.

A still further object of the invention is to provide such a method and apparatus wherein the copper wire initially has a round cross-section and a tensile strength at the elastic limit of less than 11 kg-f/mm$^2$ and a percentage elongation at break of more than 30%, the wire being reshaped into a substantially rectangular cross-section by passing the wire of round cross-section through the nip of a pair of press rollers to thereby reduce the cross-sectional area of the wire by 10% maximum.

A still further object of the invention is to provide such a method and apparatus wherein a weight-or spring-loaded dancing roller is applied to the wire between the pair of press rollers and the first reel for maintaining a tensile stress in the wire at a substantially constant value in the range of 3 to 6 kg-f/mm$^2$ between the press rollers and the first reel.

Other objects, advantages and novel features of the invention will become more apparent from the following detailed description of the invention when taken in conjunction with the accompanying drawings.

DETAILED DESCRIPTION OF THE INVENTION

Figure 1:
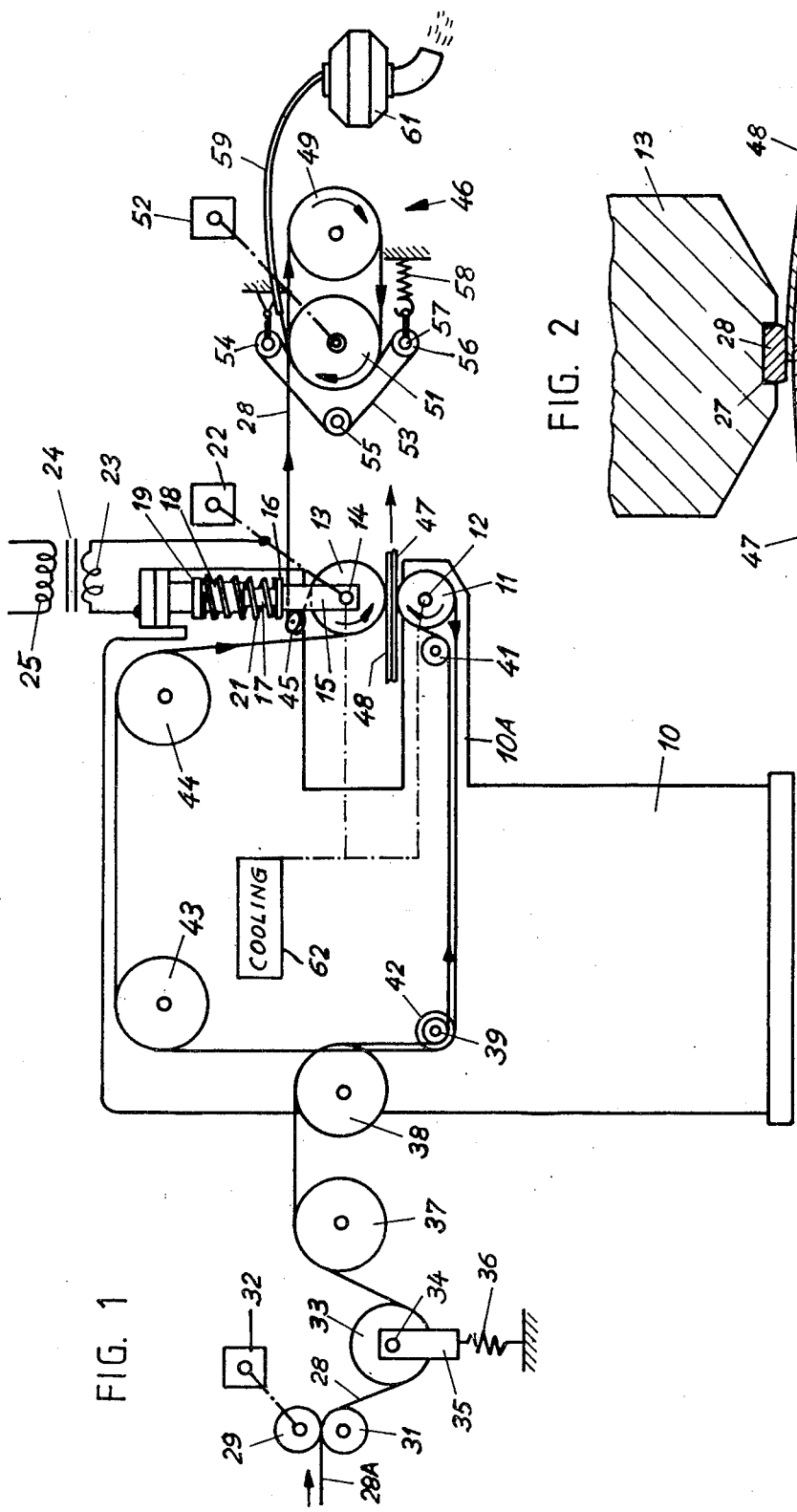
FIG. 1 is a schematic representation of an electric seam resistance welding apparatus, in side elevation, using a continuous wire electrode according to the invention.

The welding apparatus shown in FIG. 1 includes a machine frame 10 having a welding support arm 10A on which a first and bottom electrode reel 11 is mounted for rotation on an axle 12. A second and upper electrode reel 13 lies opposed to and in the same vertical plane with the first electrode reel. The second reel is secured to its axle shaft 14 which is mounted for rotation on a pair of axle support bars 15 interconnected by an upper plate 16 with a rod 17 thereon telescoping into a sleeve 18 mounted on frame 10. The sleeve has the collar 19 thereon, and a spring 21 surrounds rod 17 and sleeve 18 and extends between collar 19 and plate 16 for pressing bars 15, and thereby reel 13, downwardly toward first electrode reel 11.

Shaft 14 is operatively connected with a drive motor 22 for rotating second electrode reel 13 in the direction of its arrow. Reel 13 and its shaft 14 are electrically insulated from the machine in any suitable manner. And, a low-voltage winding 23 of an electrical welding transformer 24 is connected electroconductively, on one side, with machine frame 10 and, on the other side, with shaft 14 and thereby also with reel 13. A source of alternating current (not shown) is connectable to a high-voltage winding 25 of transformer 24 to produce a seam weld. Reel 11 is electroconductively connected with frame 10 via its axle 12.

Figure 2:
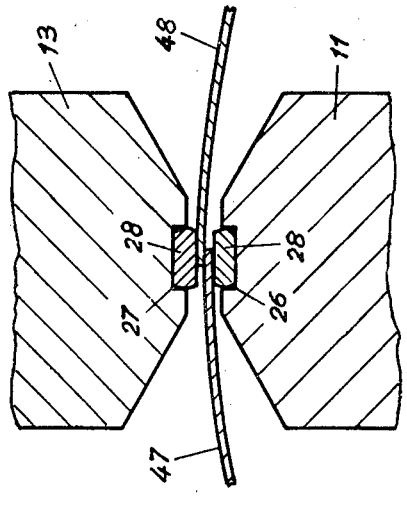
FIG. 2 is an enlarged vertical sectional view taken through the welding area of the FIG. 1 apparatus at the first and second electrode reels.

It can be seen in FIG. 2 that both reels 11 and 13 are provided along their circumferences with guide grooves 26 and 27 for receiving and guiding a continuous wire electrode 28. The wire electrode is of copper and has a substantially rectangular cross-section which is formed by flat-rolling the wire of initially round cross-section in a manner which will now be described with reference to FIG. 1.

A pair of suitably mounted press rollers 29, 31 slightly spaced apart, and lying in the same vertical plane, have on their confronting edges circumferential grooves similar to guide grooves 26, 27. One of the press rollers 29 is operatively connected with a drive motor 32 for rotating this upper roller which in turn rotates bottom roller 31 as the round wire passes therethrough. A copper wire 28A having a round cross-section is fed through the gap between the press rollers, this gap being adjusted such that the copper wire during its passage through rollers 29, 31 is rolled into a substantially rectangular cross-sectional shape as seen in FIG. 2. After leaving rollers 29, 31, the wire electrode travels under a tension or dancing roller 33 having its axle 34 mounted on a movable bearing member 35 which is resiliently urged downwardly by a spring 36 anchored in some manner at its lower end. Otherwise, a weight (not shown) could be suspended from bearing member 35 to effect the same purpose of imparting a specific tensile stress to the wire, as will be discussed in more detail hereinafter.

The copper wire then passes over guide and deflection rollers 37, 38, 39, 41 which are suitably mounted for rotation about their respective axes. The electrode wire then passes about approximately two-thirds the circumference of bottom electrode reel 11, and passes over guide and deflection rollers 42, 43, 44 mounted on the machine frame for rotation about their respective axes. The electrode wire then passes in the direction of its arrow over approximately two-thirds circumference of upper electrode reel 13, after which the wire travels over another guide and deflection roller 45 to a device 46 provided for pulling away the electrode wire from the upper reel as will be described in more detail hereinafter.

Edges 47 and 48 of a pair of workpieces or of a tubular workpiece to be seam welded together, are overlapped as shown in FIG. 2 and are passed together between electrode reels 11 and 13. However, edges 47 and 48 do not directly contact the reels but only portions of electrode wire 28 which pass about the reels. Therefore, when welding together workpiece edges of a tin plate or plates, the tin which melts from the surface while fusing the workpiece edges during welding will not adhere to reels 11 and 13 but only to copper wire 28, and is carried off with the wire from the welding area.

The device 46 for pulling away the copper wire after it leaves the upper electrode reel includes a pair of drums 49 and 51 which are spaced apart in side-by-side relationship with parallel axes, only one drum 51 being operatively connected with a drive motor 52 for rotating the drum in the direction of its arrow. The copper wire is wound, as shown, several times around part of the circumferences of both drums. An endless belt 53, guided over three deflection rollers 54, 55, 56 presses against the circumference of drum 51. Axle 57 of roller 56 is secured to an anchored spring 58 for tensioning belt 53 about drum 51 and for effecting movement of the belt during rotation of the drum. After passing from device 46, copper wire 28 is pushed through a guide tube 59 which guides the wire into a chopper 61 which cuts the copper wire into short pieces for reuse of the material.

In operation, second electrode reel 13 is rotated in the direction of its arrow by motor 22. This causes copper wire 28 to be frictionally driven in the direction of its arrow so that reel 11 is also rotated in the direction of its arrow, and the interposed overlapping ends 47 and 48 of the workpiece or workpieces to be seam welded together are advanced in the direction of the arrow thereof upon frictional engagement therewith. Spring 21 is designed to effect a welding force in the range of 60 to 70 kg, which thereby imparts to the copper wire bearing against workpiece ends 47 and 48 a compressive stress in the range of 8 to 10 kg-f/mm$^2$. Welding transformer 24 generates an alternating welding current of an intensity ranging from 4,000 to 5,000 amps which flows through workpiece ends 47 and 48 for seam welding them together. And, electrode reels 11 and 13 are cooled by a cooling medium 62 which is fed and discharged through cavities of axle 12 and shaft 14, for example, so that the temperature of the electrode reels and of the copper wire winding around them is maintained in the range of 10° to 30° C.

As described above, copper wire 28 serving as a wire electrode is delivered by press rollers 29, 31 and is rolled into the desired rectangular cross-sectional shape. Wire 28, to which tin adheres during the welding of workpiece ends of a tin plate or plates, is pulled away from reel 13 by device 46 after it travels around roller 45.

Figure 3:
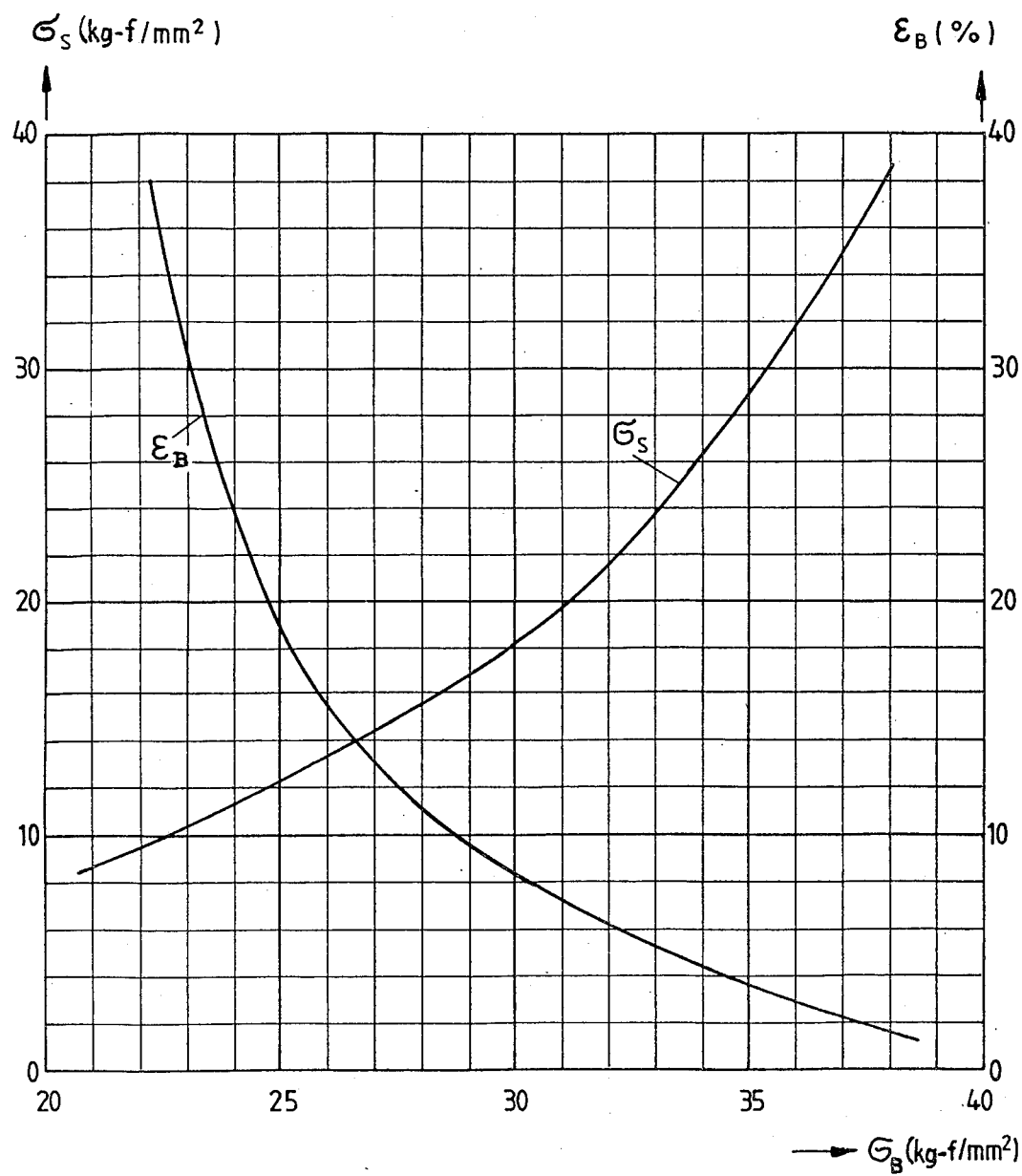
FIG. 3 is a graph illustrating the stress-strain properties of copper.

Details of copper wire 28 used in accordance with the invention will now be described. A copper wire 28A having a round cross-section serves as a starting material, and its breaking strength $\sigma_B$ (FIG. 3) lies in the range of 22 and 23 kg-f/mm². The FIG. 3 graph shows that for such a copper wire the tensile strength $\sigma_S$ at the elastic limit, i.e. with a maximum elongation most commonly taken as 0.2%, is 10 to 11 kg-f/mm², whereas the percentage elongation $\epsilon_B$ at break lies between 30 and 40%. A copper wire with these mechanical properties is usually referred to as "soft wire". If the workpiece ends 47 and 48 are of a sheet metal with a thickness of 0.10 to 1.40 mm, copper wire 28A serving as a starting material for the wire electrode will preferably have a diameter of 1.37 mm, which results in a cross-sectional area of 1.5 mm².

Copper wire 28a is reshaped between pressure rolls 29, 31 so that the rolled copper wire 28 is given a substantially rectangular cross-sectional shape having dimensions of 2.0×0.7 mm. During the rolling process, the cross-sectional area of the wire is reduced by 10% maximum, for example from 1.5 mm² to approximately 1.4 mm², whereby the breaking strength $\sigma_B$ increases to a range of 23.5 to 25 kg-f/mm², the percentage elongation $\epsilon_B$ at break is reduced to a value in the range of 26 to 17%, and the tensile strength $\sigma_S$ at the elastic limit increases to 11 up to 13 kg-f/mm². A copper wire having these mechanical properties is still classified as a "soft wire". And, it should be noted that motor 32 provided for driving rollers 29, 31 preferably has an output of approximately 1.2 kW.

Dancing roller 33 maintains the tensile stress in wire electrode 28 at substantially constant values during its travel to electrode reel 11. In the wire section between rollers 37 and 38, the wire tensile stress is preferably 3 to 4 kg-f/mm², and in the wire section between rollers 39 and 41, the wire tensile stress is preferably 5 to 6 kg-f/mm². And, because a portion of the copper wire winding around electrode reel 11 during the welding operation is driven not only by the tension produced by the driven upper electrode reel, but also by the overlapping workpiece ends which are also frictionally driven, the tensile stress in the copper wire decreased during its travel around bottom electrode reel 11. For example, in the wire section between reel 11 and roller 42, the tensile stress is 2 to 3 kg-f/mm². During its further travel to upper electrode reel 13, copper wire 28 experiences during the passage of any one of rollers 42, 43, 44, an increase in tensile stress. Thus, for example, the tensile stress in the wire section between rollers 43 and 44 attains a value in the range of 4 to 5 kg-f/mm², and in the wire section between roller 44 and reel 13 the wire section attains a value in the range of 5 to 6 kg-f/mm². Moreover, motor 22 for driving the upper electrode reel preferably delivers power of about 0.375 kW to shaft 14.

Wire pullaway device 46 produces in the wire section between roller 45 and drums 49, 51 a tensile stress preferably in the range of 8 or 10 kg-f/mm² so that a snug fit of copper wire 28 around reel 13 is assured. Motor 52, which drives drum 51, has an output of about 1.0 kw.

It can be seen that the tensile stresses in the various wire sections of copper wire 28 lie clearly below the permissable tensile strength $\sigma_S$ at the elastic limit so that, due to the prevailing tensile stresses in the copper wire, permanent elongation of the wire is avoided. By contrast, a certain elongation of copper wire 28 occurs each time it passes through the welding area between electrodes 11 and 13, because there a rolling of the copper wire takes place under the influence of the welding force effected by spring 21. Elongation of the wire occuring during travel of wire 28 around second electrode 13 is taken up by wire-pullaway device 46 and therefore has no effect whatsoever on the welding. Elongation of the copper wire 28 during its travel around the bottom electrode reel 11 is, however, another matter.

It has been shown that with the above-indicated values for the welding force, for the temperature of the electrode reels and for the tensile stress in the wire sections between the bottom and top electrode reels, copper wire 28 on its travel around bottom electrode reel 11 during the welding experiences an elongation of approximately 5%. The copper wire experiences an additional elongation of approximately the same magnitude during its travel around top electrode reel 13. Consequently, the feed rates of the two portions of the copper wire that come into contact with workpiece ends 47 and 48 differ by about 10%. The two workpiece ends 47 and 48 assume a feed rate which equals the arithmetic mean value of the feed rates of the lower and upper wire portions at the welding area. This causes a slip of approximately 5% between the wire portion travelling around bottom electrode reel 11 and the lower workpiece end 47, while at the same time a slip likewise of approximately 5% occurs in the opposite direction between the wire portions travelling around top electrode 13 and the upper workpiece end 48. However, this slip was unexpectedly found to have no adverse influence on the quality of the resulting seam weld. In practice, the slip is even permitted to increase to ±6% which corresponds to an elongation of 12% of the copper wire serving as the wire electrode.

Since, contrary to the view prevailing heretofore as to the indispensibility of the use of a hard wire as a wire electrode, that is to say, copper wire with such increased strength at the elastic limit that no additional elongation takes place during its first passage through the welding area, according to the teachings of the invention a copper wire with an allowable tensile strength of only 11 to 13 kg-f/mm² at the elastic limit can be used as a wire electrode. Such a copper wire, which is nevertheless classified as a "soft wire", is less rigid and less brittle than a hard wire, so that it can be handled with greater ease and it can also be guided over the various rollers of the welding machine with smaller deflection forces required, thereby allowing a reduction in the tensile stresses in the wire. Another advantage of the use of a "soft" copper wire over a hard wire is that the "soft" wire conforms more easily to the surfaces of the workpiece ends to be welded together and leads to an improvement in the quality of the resulting seam. Finally, use of the "soft wire" is less likely to cause service problems because it is less brittle than hard wire.

Obviously, many modifications and variations of the present invention are made possible in the light of the above teachings. It is therefore to be understood that within the scope of the appended claims the invention may be practiced otherwise than as specifically described.

What is claimed is:

1. An electrical resistance seam welding method in which a continuous wire electrode is passed successively over a first electrode reel and over a second electrode reel, via a plurality of guide and deflection rollers, said wire electrode passing over said reels in confronting relationship and being pressed together by said reels, by a predeterminded welding force, against interposed workpieces to be seam welded together, an electric current being applied which passes from one of said reels to the other of said reels through said wire electrode and said interposed workpieces, said wire electrode being motor driven for feeding the workpieces through said reels, the improvement comprising utilizing a copper wire as said wire electrode having a tensile strength at the elastic limit of between 11 and 13 kg-f/mm$^2$ and having a percentage elongation at break in the range of 26 and 17% pressing said reels together by a force of 60 to 70 kg, said copper wire being subject to a tensile stress of less than 10 kg-f/mm$^2$ while passing over and between said reels, and maintaining said reels at an operating temperature of 10° to 30° C., so that a maximum elongation of said wire of 6% when passing over said first reel, and a maximum further elongation of said wire of 6% when passing over said second reel, is obtained.

2. The method according to claim 1, further comprising utilizing said copper wire having the tensile strength at the elastic limit of approximately 12 kg-f/mm$^2$, and the percentage elongation at break of approximately 21%.

3. The method according to claim 1, further comprising imparting to said copper wire a tensile stress of 2 to 6 kg-f/mm$^2$ while passing over and between said reels.

4. The method according to claim 1, further comprising a motor driving said second reel for driving said copper wire about said reels which effects a rotation of said first reel and a forward advancing of said interposed workpieces, and imparting to said copper wire a maximum tensile stress of 6 kg-f/mm$^2$ before said wire reaches said first reel.

5. The method according to claim 1, further comprising pulling said copper wire away from said second reel for imparting thereto a tensile stress of 10 kg-f/mm$^2$ maximum.

6. The method according to claim 1, further comprising selecting said copper wire as initially having a round cross-section and a tensile strength at the elastic limit of less than 11 kg-f/mm$^2$ and a percentage elongation at break of more than 30%, and thereafter reshaping said copper wire into a substantially rectangular cross-sectional shape, the reshaping being carried out by passing the wire of round cross-section through the nip of a pair of press rollers to thereby reduce the cross-sectional area of the wire by 10% maximum.

7. The method according to claim 4, further comprising applying to said copper wire a weight- or spring-loaded dancing roller between said pair of press rollers and said first reel for maintaining a tensile stress in said wire at a substantially constant value in the range of 3 to 6 kg-f/mm$^2$ between said press rollers and said first reel.

8. An electric resistance seam welding apparatus including a frame having edge confronting first and second electrode reels and as well as guide and deflection rollers rotatably mounted thereon, a continuous wire electrode arranged for successively passing over said first reel and then over said second reel via said guide and deflection rollers, means for driving one of said reels, means for pressing said reels together by a welding force of 60 to 70 kg for applying said force against overlapping workpiece ends disposed between portions of said wire which pass over said reels, means for applying an electric current which passes from one of said reels to the other of said reels through said wire electrode and the interposed workpiece ends for seaming them together, means for cooling said reels to an operating temperature in the range of 10° to 30° C., said wire electrode comprising a copper wire having a tensile strength at the elastic limit of 11 to 13 kg-f/mm$^2$ and a percentage elongation at break in the range of 26 to 17%, before passing over said first reel, said driving means rotating said second reel which, by means of said copper wire, rotates said first reel, whereby said copper wire between said reels is subject to a tensile stress of less than 10 kg-f/mm$^2$.

9. The apparatus according to claim 8, wherein the tensile strength of said wire at the elastic limit is about 12 kg-f/mm$^2$ and the percentage elongation at break of said wire is about 20%.

10. The apparatus according to claim 8, wherein said tensile stress of said wire is 6 kg-f/mm$^2$ maximum between said reels.

11. The apparatus according to claim 8, further comprising means for pulling said copper wire away from said second reel so as to effect a wire tensile stress of 10 kg-f/mm$^2$ maximum.

12. The apparatus according to claim 8, wherein said copper wire initially has a round cross-section, a tensile strength at the elastic limit of less than 11 kg-f/mm$^2$ and a percentage elongation at break of more than 30%, a motordriven pair of press rollers being provided for pressing the copper wire into a shape substantially rectangular in cross-section while reducing the cross-sectional area of said wire by 10% maximum.

13. The apparatus according to claim 12, further comprising a weight- or spring-loaded dancing roller located between said press rollers and said first reel for effecting a wire tensile stress of 3 to 6 kg-f/mm$^2$ before passing over said first reel.

* * * * *